UNITED STATES PATENT OFFICE.

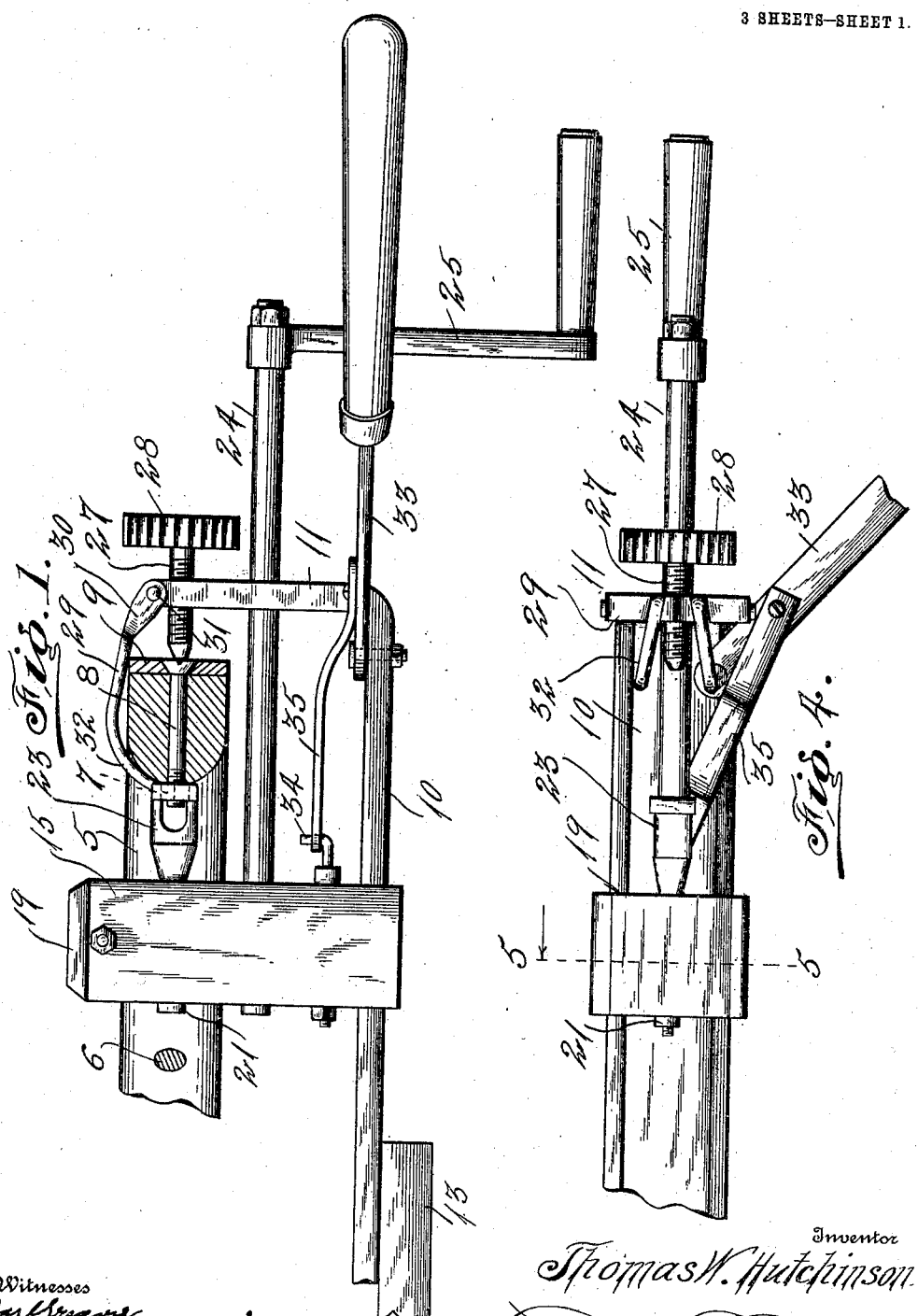

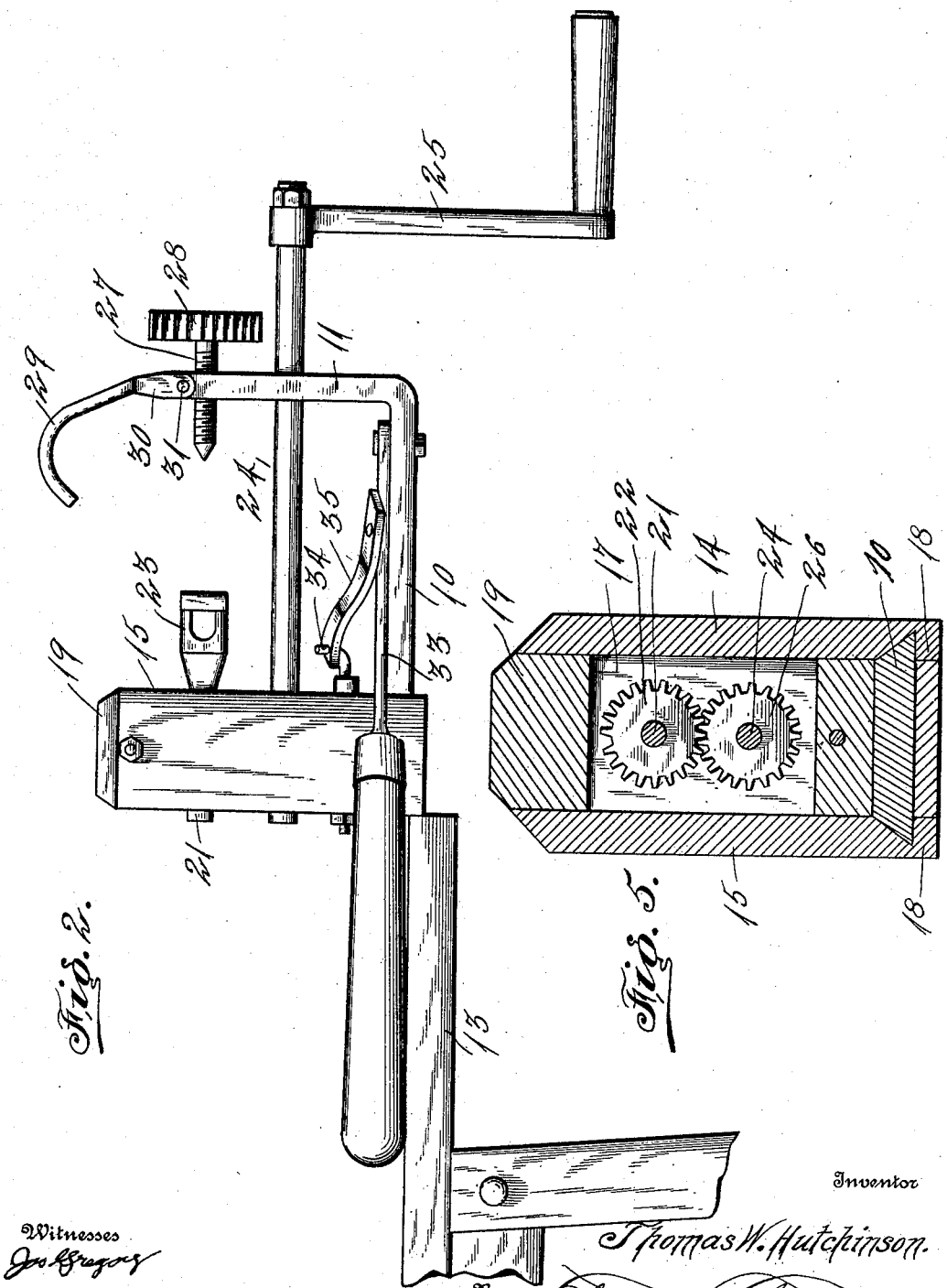

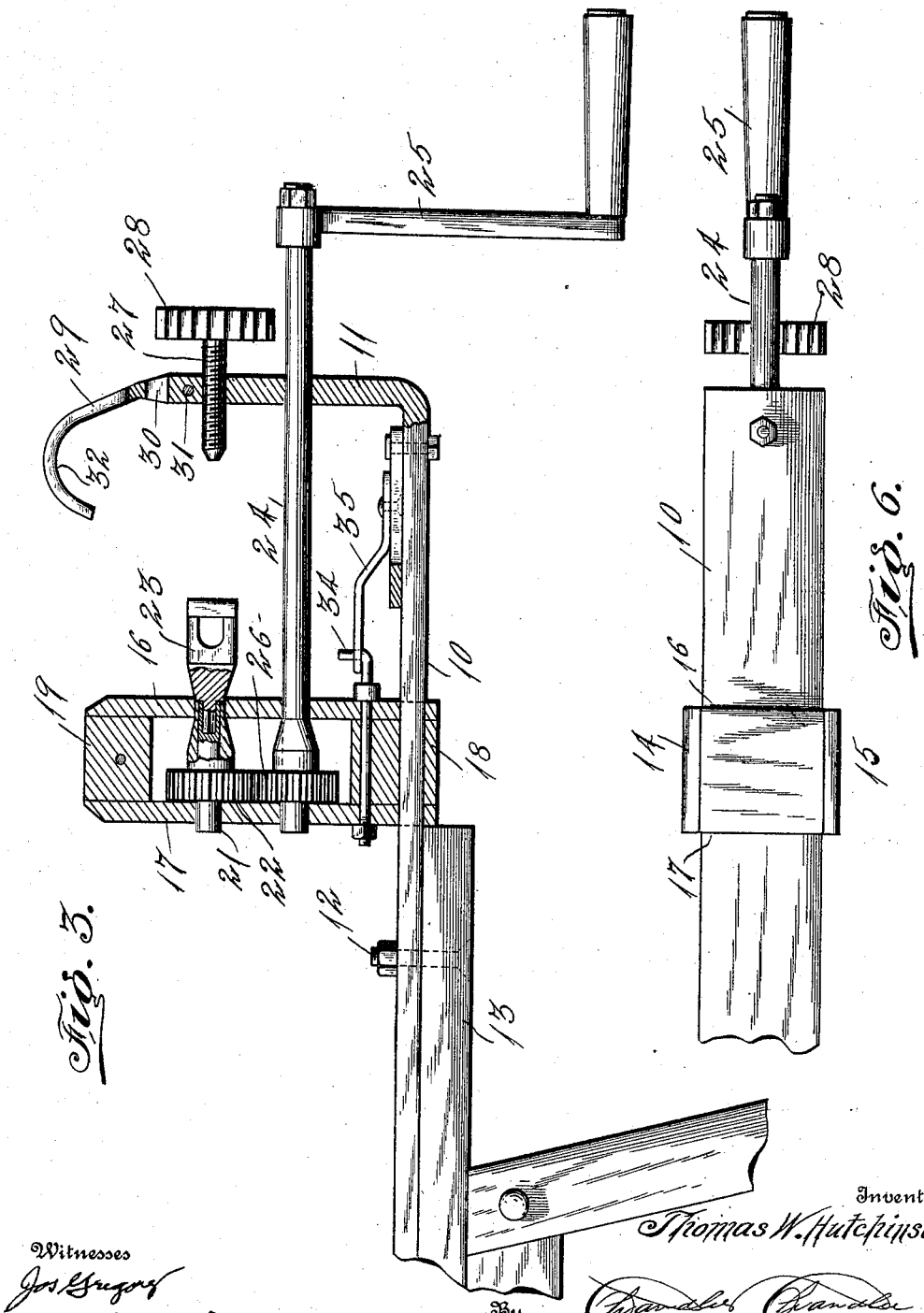

THOMAS W. HUTCHINSON, OF MIDDLEBURY, INDIANA.

TIRE-BOLT WRENCH.

980,527.  Specification of Letters Patent.  Patented Jan. 3, 1911.

Application filed June 18, 1909. Serial No. 502,948.

*To all whom it may concern:*

Be it known that I, THOMAS W. HUTCHINSON, a citizen of the United States, residing at Middlebury, in the county of Elkhart, State of Indiana, have invented certain new and useful Improvements in Tire-Bolt Wrenches; and I do hereby declare the following to be a full, clear, and exact description of the invention, such as will enable others skilled in the art to which it appertains to make and use the same.

This invention relates to improvements in wheel-wright tools and more particularly to the kind employed in tightening on tire bolts.

It has for its object the provision of a device of that kind which may be readily adjusted to the various thicknesses of fellies.

Another object is the provision of a device for engaging the wheel and holding the same against movement during the operation of tightening the nut and bolt.

A further object is the provision of a construction for engaging the bolt during the tightening of the nut so as to prevent the bolt from turning.

With these and other objects in view as will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size and minor details of the device may be made without departing from the spirit or sacrificing any of the advantages of the invention.

In the accompanying drawings forming part of the specification:—Figure 1 is a side elevation of the device showing its application to a wheel and in position to tighten the tire bolt. Fig. 2 is a similar view but showing the position of the parts after the wheel has been removed. Fig. 3 is a longitudinal sectional view of the device. Fig. 4 is a plan view. Fig. 5 is a sectional end elevation taken on the line 5—5 of Fig. 4. Fig. 6 is a bottom plan view of the device.

Similar numerals of reference are employed to designate corresponding parts throughout.

In the drawings, the numeral 5 represents the felly of the wheel, 6 the spokes, 7 the nut and 8 the bolt which extends through the felly and tire 9. In order that the nut may be tightened on to the bolt after the tire has been placed on the rim or in order that the nut may be removed whenever desired it is obvious that a wrench or the like must be employed to engage the nut. The present invention aims to provide such a device and in the present instance is shown to consist of a bracket arm 10 which may be of any suitable length and is preferably formed of a single piece of metal, oblong in contour and having a portion adjacent one end turned at right-angles as shown at 11. The opposite sides of the body portion 10 of the bracket may be beveled for a purpose to be presently described. That end of the bracket arm remote from the right-angular extension 11 is provided with openings for the reception of bolts 12, or the like by means of which it is secured to a bench or table 13 in such position that the opposite or angular end will project considerably in advance of the side or end of the table to which the opposite end is secured. What will subsequently be termed a wrench carriage is in the present instance shown to consist of a rectangular shaped housing having opposite side walls 14 and 15 which are connected by means of the front and rear walls 16 and 17. The lower end portions of the side walls 14 and 15 extend a trifle below the lower end of the front and rear walls 16 and 17 and are spaced apart sufficiently far to completely straddle the body portion 10 of the bracket and are inclined slightly outward to conform to the beveled sides of the body portion 10 and are thence turned inwardly as shown at 18 so as to bear on the lower face of the body portion 10 of the bracket. Thus it will be seen by virtue of the disposition of the parts the carriage will be slidingly fitted on the portion 10 of the bracket, the lower edges of the front and rear walls bearing on that face of the bracket opposite to the in-turned portions 18. The upper ends of the side, front and rear walls are connected by the top 19. The carriage may be of any suitable height and in the present instance is shown to be slightly greater than the height of the right-angular extension 11 at the free end of the body portion 10. Journaled in the front and rear walls 16 and 17 are the opposite ends of a shaft 21. This shaft is disposed adjacent the top or cover 19 and has keyed thereto and disposed within the carriage and adjacent the rear wall 17 a crown gear 22. That end of the shaft extending through the front wall 16 is provided with a bore which is non-cylindrical in contour and is designed to receive the shank of a socket 23. The latter may be of any well known type and is of a size to fit the nut to which it is to be applied. By virtue of the bore at the front end of the shaft 21 sockets of various diameters may be readily inserted therein, according to the nut to be turned. The front and rear walls 16 and 17 are provided with openings disposed beneath the openings for the reception of the shaft 21 and lying in a vertical plane with the latter and these openings are in direct alinement with the openings formed in the right-angular extension 11. Journaled in these openings is a shaft 24, one end of which extends considerably in advance of the extension 11 and is provided at one end with a crank handle 25. That portion of the shaft 24 disposed within the carriage has keyed thereto a crown gear 26, the teeth of which mesh with the gear 22. Thus it will be seen when the crank handle is turned the socket 23, through the gears 22 and 26, will be rotated.

By referring now to Fig. 1 it will be seen that the socket 23 is in position to turn the nut and in order to prevent the bolt from turning with the nut as the socket rotates a clamp screw 27 is employed. This member is threaded through an opening adjacent the upper end of the right-angular extension 11 and in axial alinement with the socket 23, the outer end of the clamp screw 27 being provided with a hand wheel 28. Thus it will be seen when the wheel has been secured in place as shown in Fig. 1 and the socket brought to engage with the nut, by turning the clamp screw 27 its inner end will bear on the end of the bolt sufficiently to prevent the latter from turning as the nut rotates with the socket. When the parts are in this position and it is undesirable to have the wheels move a fork 29 is provided. This member is provided at its lower end with jaws 30, which straddle the upper end of the right-angular extension 11 and are secured thereto by means of a pivot bolt 31. The jaws converge into a shank, which likewise terminates in bifurcations 32 which are curved to substantially a U shape. The fork 29 is so disposed that it will move to and from the carriage so that when a wheel has been secured in place as shown in Fig. 1, the former may be lowered so as to engage the spokes or other portion of the wheel to prevent turning.

In order that the carriage and shaft 24 may be moved bodily on the portion 10 of the bracket, the following construction is employed:—By referring now to the drawings it will be seen that pivoted to the upper face of the portion 10 and adjacent the right-angular extension 11 is one end of a lever 33 which moves in a horizontal plane, and projecting from the central portion and adjacent the lower end of the front wall 16 of the carriage is a right-angular shaped hook 34 and connection between the hook 34 and that portion of the lever adjacent its pivotal point is established by means of a link 35, one end of which is provided with an opening to receive the hook 34 and the opposite end of which is pivoted to the lever. Thus it will be seen when the lever is moved in one direction it will carry with it the link 35, and by virtue of the latter's connection with the carriage the latter will be moved toward the right-angular extension 11, and as the carriage moves the shaft 24 will likewise move through the openings in the right-angular extension 11. This will be the position of the parts when the socket has been drawn into engagement with the nut to be turned, and after the latter has been tightened or disengaged from the bolt, by moving the lever in the opposite direction the socket will be moved sufficiently far from the wheel in order that the latter may be turned so as to bring the next nut into position to be engaged by the socket.

Having thus described my invention what is claimed as new, is:—

1. A tire bolt wrench comprising a horizontally disposed arm having its opposite longitudinal sides beveled and terminating at one end in a vertical extension, a carriage having portions adjacent the lower ends of its opposite sides beveled and bearing on the beveled sides of the arm and further provided on its opposite sides and below the beveled portions with in-turned extensions bearing on the lower face of said arm, a socket rotatably mounted in said carriage, a shaft journaled in said carriage and in said vertical extension and adapted to rotate said socket, a clamp screw threaded into the vertical extension and in axial alinement with said socket, an operating lever having one end pivoted to said arm in advance of said carriage and operating to advance said carriage in the direction of said clamp and a link connection between said operating lever and said carriage, said link overlying said arm and being terminally connected to the lever in approximately the plane of said socket, whereby wabbling of the carriage when being advanced on the arm is prevented.

2. A tire bolt wrench comprising an arm having its opposite longitudinal edges beveled, an arched carriage having notched walls bearing on said beveled edges, a plurality of meshing gears housed within said carriage, a socket assembled with one of the gears, an operating lever pivoted on the arm, a link connected to the lever and overlying the arm, said link being terminally connected to the carriage in approximately the plane of said socket whereby the carriage is advanced on the arm without wabbling, said arm being provided at its free end with a wheel gripping extension, and a clamp carried by the extension in alinement with said socket.

In testimony whereof, I affix my signature, in presence of two witnesses.

THOMAS W. HUTCHINSON.

Witnesses:
FRANK GARDNER,
CHAS. L. SWARTZ.